(12) United States Patent
Xiao

(10) Patent No.: US 8,320,113 B2
(45) Date of Patent: Nov. 27, 2012

(54) FOLDABLE DEVICE

(75) Inventor: Jin-Wei Xiao, Shenzhen (CN)

(73) Assignees: Fu Tai Hua Industry (Shenzhen) Co., Ltd., ShenZhen, Guangdong Province (CN); Hon Hai Precision Industry Co., Ltd., Tu-Cheng, New Taipei (TW)

( * ) Notice: Subject to any disclaimer, the term of this patent is extended or adjusted under 35 U.S.C. 154(b) by 295 days.

(21) Appl. No.: 12/891,774

(22) Filed: Sep. 27, 2010

(65) Prior Publication Data
US 2012/0025682 A1     Feb. 2, 2012

(30) Foreign Application Priority Data
Jul. 29, 2010  (CN) .......................... 2010 1 0240186

(51) Int. Cl.
*G06F 1/16* (2006.01)
(52) U.S. Cl. ................................ 361/679.27; 455/575.3
(58) Field of Classification Search .................. 312/326; 361/679.27
See application file for complete search history.

(56) References Cited

U.S. PATENT DOCUMENTS

| | | | | |
|---|---|---|---|---|
| 6,839,576 | B2 * | 1/2005 | Aagaard et al. | 455/575.1 |
| 7,379,292 | B2 * | 5/2008 | Tsai et al. | 361/679.27 |
| 7,443,659 | B2 * | 10/2008 | Cho | 361/679.27 |
| 7,573,703 | B2 * | 8/2009 | Chuang et al. | 361/679.27 |
| 7,697,964 | B2 * | 4/2010 | Hwang | 455/575.3 |
| 7,707,690 | B2 * | 5/2010 | Lowry et al. | 16/367 |
| 7,844,050 | B2 * | 11/2010 | Hwang et al. | 379/433.13 |
| 8,024,843 | B2 * | 9/2011 | Endo et al. | 16/367 |

* cited by examiner

*Primary Examiner* — Lisa Lea Edmonds
(74) *Attorney, Agent, or Firm* — Altis Law Group, Inc.

(57) ABSTRACT

An exemplary foldable device includes a main body, a cover coupling a display unit, and a hinge mechanism rotatably connecting the cover to the main body. The main body includes a first connecting rod defining a first connecting hole and a second connecting rod defining a second connecting hole. The hinge mechanism includes two support plates, a rotary member, and a rotary shaft. The two support plates are fixed to the first connecting rod. The rotary member is rotatably positioned between the two support plates and defines a through hole. The rotary shaft includes a first end that extends through the through hole of the rotary member and can be fitted into the first connecting hole or the second connecting hole, and an opposite second end fixed to the cover. Thus the cover can be rotated about the first connecting rod or the second connecting rod.

4 Claims, 5 Drawing Sheets

FOLDABLE DEVICE

BACKGROUND

1. Technical Field

The present disclosure relates to a foldable device.

2. Description of the Related Art

Generally, foldable devices, e.g. notebook computers and cellular telephones, include a main body and a cover rotatably connected to the main body. During use, only users in front of the device can view the device. There is a need to provide a foldable device that the users off to one side can view without moving the device.

BRIEF DESCRIPTION OF THE DRAWINGS

The components of the drawings are not necessarily drawn to scale, the emphasis instead being placed upon clearly illustrating the principles of a foldable device. Moreover, in the drawings, like reference numerals designate corresponding parts throughout several views.

DETAILED DESCRIPTION

Figure 1:
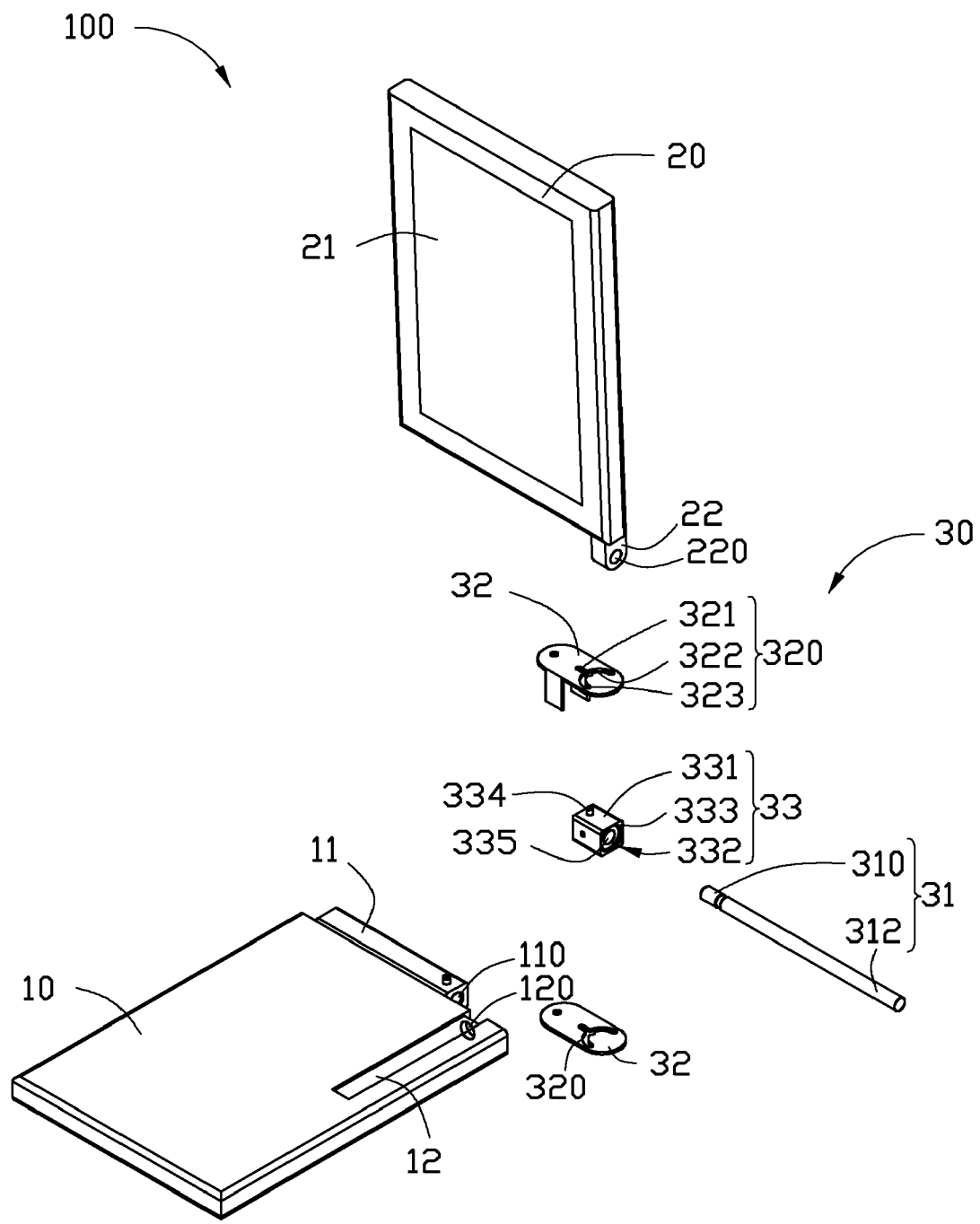
FIG. 1 is an exploded, isometric view of a foldable device according to an exemplary embodiment.

Referring to FIG. 1, a foldable device 100 according to an exemplary embodiment is illustrated. The foldable device 100 includes a main body 10, a cover 20, and a hinge mechanism 30 rotatably connecting the cover 20 to the main body 10. The cover 20 includes a display unit 21 that can be hidden and protected by the cover 20 while the cover 20 is closed to the main body 10.

Figure 2:
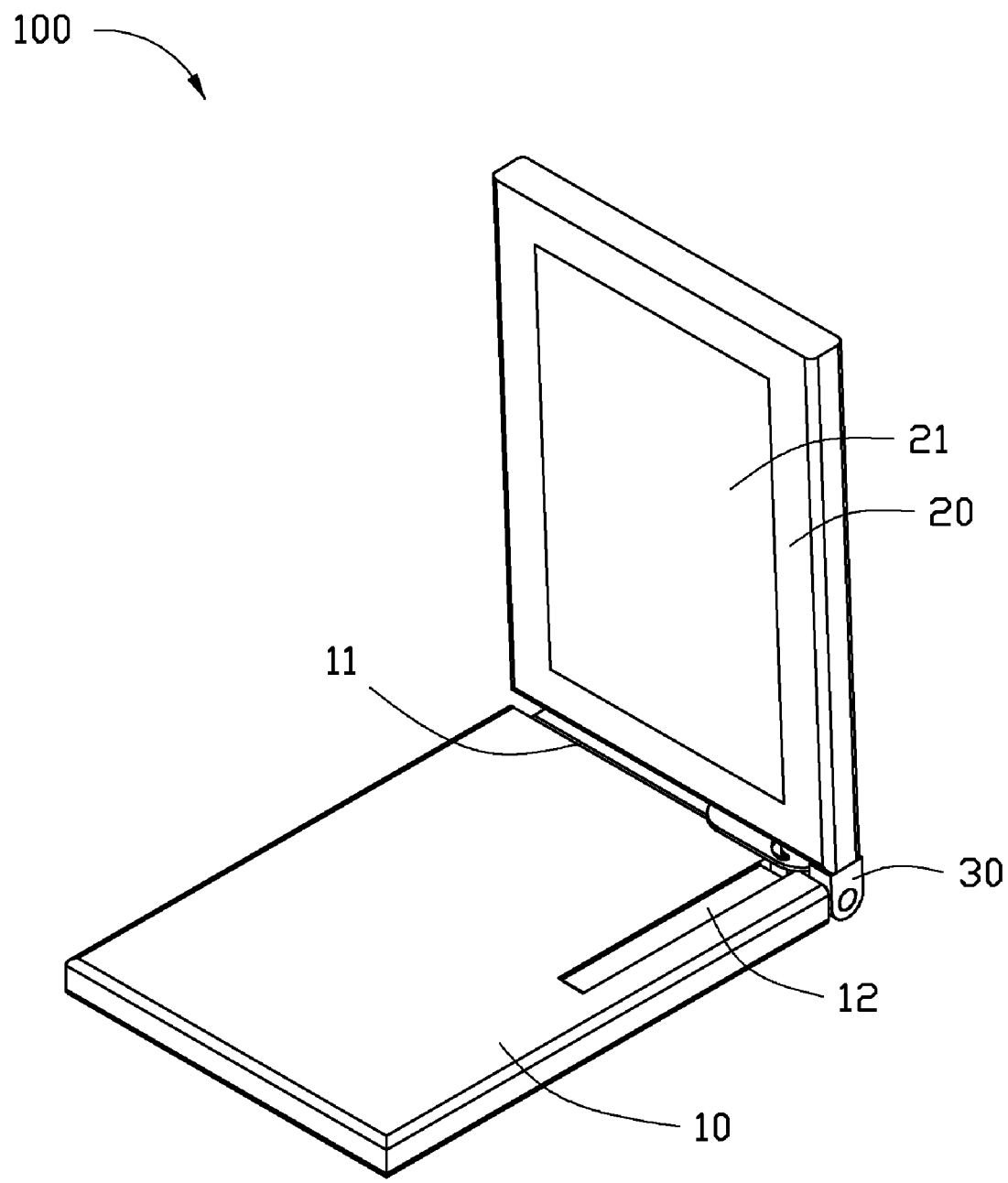
FIGS. 2-5 are isometric views of a rotation process from a first state to a second state of the foldable device of FIG. 1.
Figure 3:
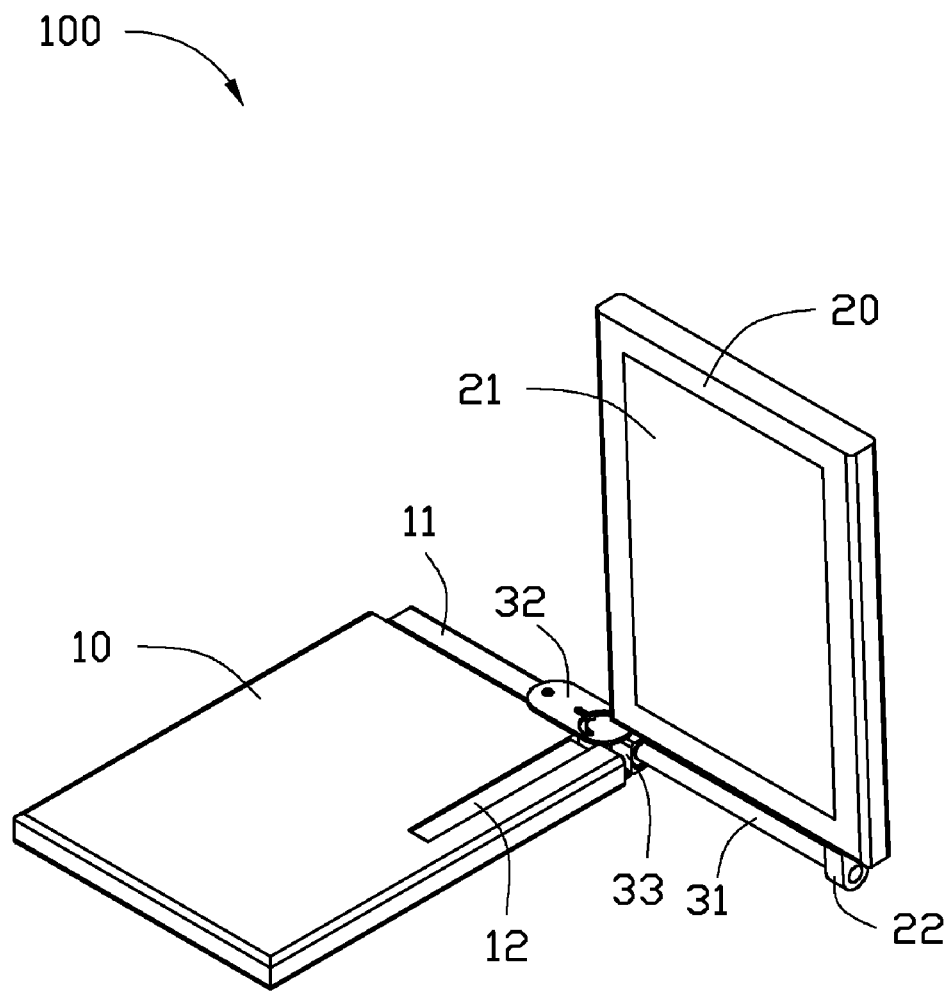
Figure 4:
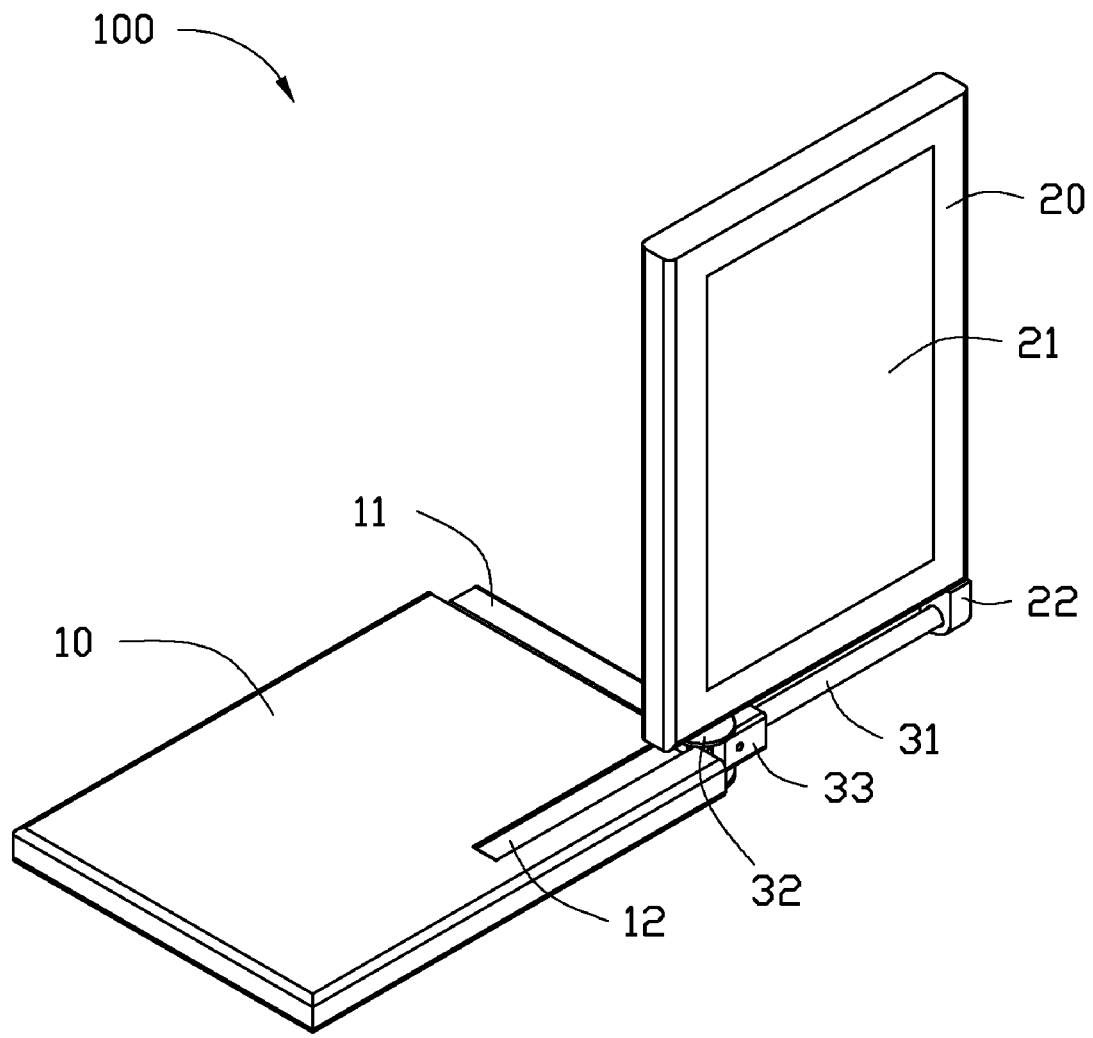
Figure 5:
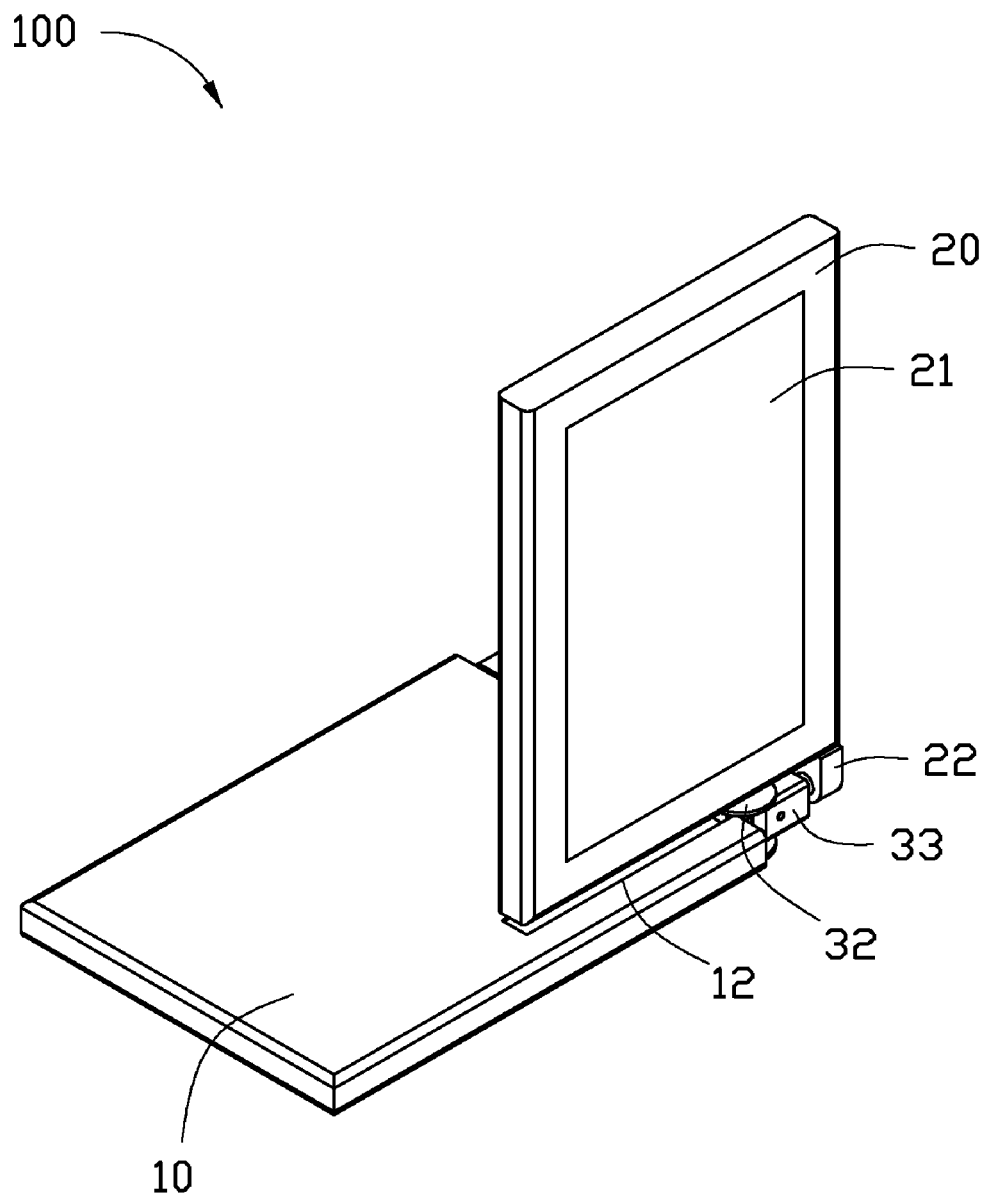

Referring to FIG. 2, the main body 10 includes a first connecting rod 11 and a second connecting rod 12. The first connecting rod 11 defines a first connecting hole 110 therein, and the second connecting rod 12 defines a second connecting hole 120 therein. The first connecting hole 110 and the second connecting hole 120 are through holes and extend substantially perpendicularly to each other. The cover 20 includes a fastening block 22 which defines a fastening hole 220.

The hinge mechanism 30 includes a rotary shaft 31, two support plates 32, and a rotary member 33. The rotary shaft 31 includes a first end 310 and an opposite second end 312. The support plates 32 each define a sliding slot 320. The sliding slot 320 includes a first slot 321 and a second slot 322, communicating with each other. The first slot 321 is line shaped, and the second slot 322 is arcuate shaped and includes a distal end 323. The support plates 32 are respectively fixed to a bottom and a top of the first connecting rod 11. The rotary member 33 includes a top surface 331, a bottom surface 332, and two opposite side surfaces 333 between the top surface 331 and the bottom surface 332. The top surface 331 and the bottom surface 332 each form a protrusion 334 thereon. The rotary member 33 further defines a through hole 335. The through hole 335 spans through both the two side surfaces 333 and is aligned with the fastening hole 220 of the fastening block 22. The rotary member 33 is rotatably positioned between the two support plates 32 with the protrusions 334 fitted in the sliding slots 320. The first end 310 of the rotary shaft 31 extends through the through hole 335, and the second end 312 is fixed within the fastening hole 220 of the cover 20.

Referring to FIGS. 2-5, a rotation process of the cover 20 from a first state to a second state is shown. In the first state, the rotary shaft 31 is fitted within the first connecting hole 110 of the first connecting rod 11, and the cover 20 can be rotated about the first connecting rod 11.

During rotation, the rotary shaft 31 is pulled out of the first connecting hole 110 of the first connecting rod 11. The protrusions 334 of the rotary member 33 are moved along the first slots 321 of the two support plates 32 till it reaches the second slot 322, and thus, the cover 20 is rotated, causing the protrusions 334 to slide along the second slots 322. Until the protrusions 334 contact with the distal end 323, the rotary shaft 31 is then aligned with the second connecting hole 120 of the second connecting rod 12. The rotary shaft 31 fits into the second connecting hole 120 of the connecting rod 12, and the cover 20 is in the second state that can be rotated about the second connecting rod 12.

Although the present disclosure has been specifically described on the basis of certain embodiments thereof, the disclosure is not to be construed as being limited to the described embodiments. Various changes or modifications may be made to the embodiments without departing from the scope and spirit of the disclosure.

What is claimed is:

1. A foldable device comprising:
    a main body comprising a first connecting rod defining a first connecting hole and a second connecting rod defining a second connecting hole;
    a cover comprising a display unit; and
    a hinge mechanism comprising:
        two support plates fixed to the first connecting rod;
        a rotary member rotatably positioned between the two support plates and defining a through hole; and
        a rotary shaft comprising a first end and an opposite second end, wherein the first end extends through the through hole and can be fitted into the first connecting hole, and the second end is fixed to the cover, thus the cover can be rotated about the first connecting rod, wherein:
    when the rotary shaft is pulled out of the first connecting hole, the rotary shaft can be aligned with and fitted into the second connecting hole while rotating between the two support plates, thus the cover can be rotated about the second connecting rod.

2. The foldable device as described in claim 1, wherein the cover comprises a fastening portion defining a fastening hole used for fixing the second end of the rotary shaft therein.

3. The foldable device as described in claim 1, wherein the first connecting hole and the second connecting hole are through holes and extend substantially perpendicularly to each other.

4. The foldable device as described in claim 1, wherein the two support plates each define a sliding slot, the sliding slot comprises a line shaped first slot and an arcuate shaped second slot communicating with each other, and the rotary member defines two protrusions respectively fitted in the sliding slot.

* * * * *